United States Patent [19]

Inatsu et al.

[11] Patent Number: 5,390,167
[45] Date of Patent: Feb. 14, 1995

[54] CODE-DIVISION MULTIPLEX COMMUNICATION APPARATUS

[75] Inventors: Minoru Inatsu, 3-1-13, Matubara, Setagaya-ku, Tokyo 156, Japan; Kimio Watanabe, Kawasaki, Japan

[73] Assignees: Fujitsu Limited, Kanagawa; Minoru Inatsu, Tokyo, both of Japan

[21] Appl. No.: 152,047

[22] Filed: Nov. 12, 1993

[30] Foreign Application Priority Data

Mar. 16, 1993 [JP] Japan .................................. 5-055570

[51] Int. Cl.6 .............................................. H04J 13/00
[52] U.S. Cl. ...................................... 370/18; 375/1; 380/46; 455/50.1; 455/63
[58] Field of Search ................. 370/18; 375/1; 380/46; 455/50.1, 52.1, 63; 307/411, 471

[56] References Cited

U.S. PATENT DOCUMENTS 4,644,523 2/1987 Horwitz .............................. 370/18

OTHER PUBLICATIONS

Yutaka Nishikado et al., "A New Encoding and Decoding Schemes for Multiple Access Channels," The Transactions of the IECE of Japan, vol. E61, No. 4, Apr. 1978, pp. 310-311.

*Primary Examiner*—Melvin Marcelo

[57] ABSTRACT

A code-division multiplex communication apparatus for carrying out multiplex communication by using pseudo noise (PN) codes and an application system thereof are provided, which have high SN ratio and can be used in an environment wherein feeble radio waves are to be received or the strength of output radio waves is regulated. Exclusive-OR circuits output exclusive ORs each based on data and a PN code associated with the corresponding channel, and a majority logic circuit performs a majority logic operation on the exclusive ORs. Namely, the majority logic circuit outputs a logical "1" or "0" that is greater in number. The majority logic output is subjected to phase modulation and is then transmitted as a transmission signal. The transmission signal is demodulated at a receiving side, based on the same PN codes as those used at the transmitting side, thereby demodulating the data. The code-division multiplex communication apparatus is applicable to radio LAN and FA system.

14 Claims, 19 Drawing Sheets

| X1 | X2 | X3 | Y |
|----|----|----|---|
| 0  | 0  | 0  | 0 |
| 0  | 0  | 1  | 0 |
| 0  | 1  | 0  | 0 |
| 0  | 1  | 1  | 1 |
| 1  | 0  | 0  | 0 |
| 1  | 0  | 1  | 1 |
| 1  | 1  | 0  | 1 |
| 1  | 1  | 1  | 1 |

$$[Y = X1 \cdot X2 + X2 \cdot X3 + X3 \cdot X1]$$

FIG. 12

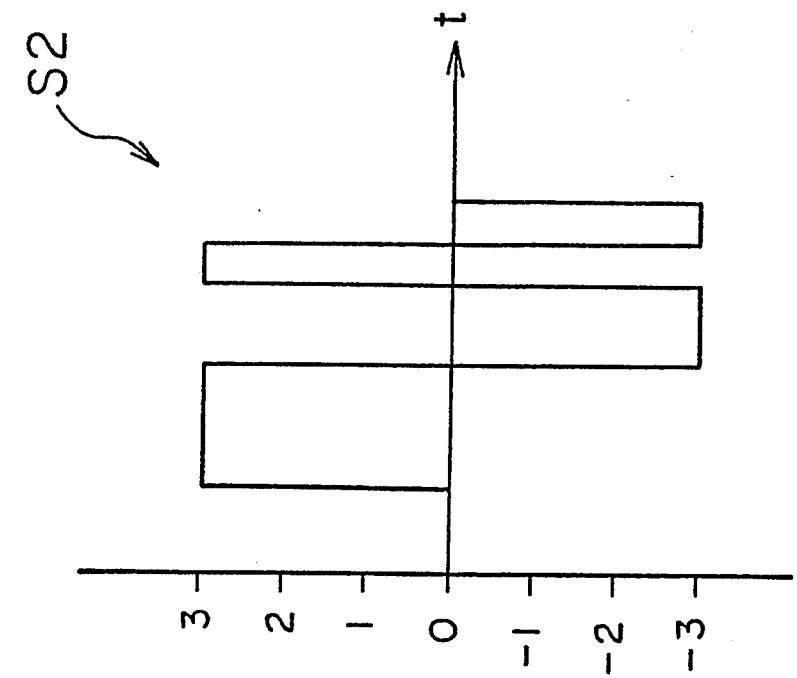
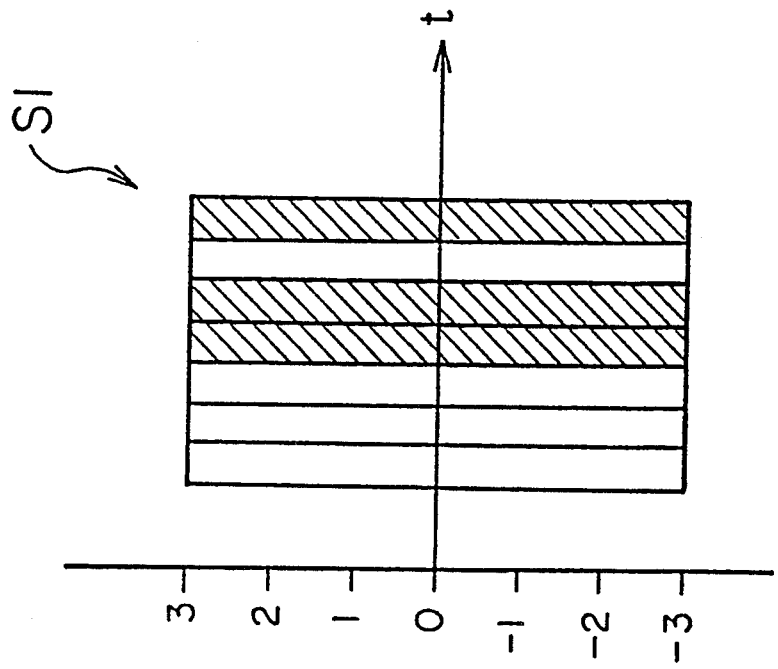
FIG. 14

CODE-DIVISION MULTIPLEX COMMUNICATION APPARATUS

BACKGROUND OF THE INVENTION

1. Field of the Invention

The present invention relates to a code-division multiplex communication apparatus for carrying out multiplex communication by using pseudo noise (PN) codes and to an application system thereof, and more particularly, to a code-division multiplex communication apparatus and an application system thereof for use in an environment wherein feeble radio waves are to be received or the strength of output radio waves is regulated.

2. Description of the Related Art

PN code-based communication apparatuses which carry out spread spectrum modulation using PN codes, are capable of multiplexing, and are tolerant to interference. Thus, this type of communication apparatuses is used for satellite communications dealing with feeble radio waves or in an environment wherein the strength of output radio waves is regulated.

A conventional code-division multiplex communication apparatus will be described below.

FIG. 1 is a block diagram illustrating a transmitting side of a conventional code-division multiplex communication apparatus wherein data channels used (hereinafter merely referred to as "channels") are three in number. The transmitting side comprises three exclusive-OR circuits 11 to 13 provided, respectively, for the data channels CH1 to CH3 to obtain exclusive ORs based on the data D1 to D3 and corresponding PN codes PN1 to PN3, double balanced modulators (DBM) 41 to 43 for subjecting the outputs X1 to X3 of the exclusive-OR circuits 11 to 13 to binary phase-shift keying (BPSK) by using a carrier wave $f_L$, and a synthesizing circuit 60 for synthesizing the outputs of the modulators 41 to 43 and outputting the resulting signal as a transmission wave Sr.

The operation of the transmitting side constructed as above will be now explained.

FIG. 2 shows an example of PN codes used in the code-division multiplex communication apparatus. As illustrated, the PN codes used are the three-stage shift register-based M sequence codes (maximum length linear shift register sequence codes), and each has a maximum-length connection tap of [3, 1] and a code length of seven bits (per frame). Namely, the channels are three in number, and the PN codes associated with the channels are individually shifted by one bit. More specifically, the code PN2 of CH2 is shifted from the code PN1 of CH1 by one bit, and similarly, the code PN3 of CH3 is shifted from the code PN2 by one bit. The time length of this seven-bit PN code corresponds to the time length of one-bit data to be transmitted.

Now, the way of how data is transmitted will be described in detail.

FIG. 3 illustrates an example of how data is modulated using PN codes, wherein it is assumed that data D1 "1", data D2 "1" and data D3 "0" are to be transmitted through the channels CH1, CH2 and CH3, respectively.

First, exclusive-OR elements 11a, 12a and 13a each obtain an exclusive OR based on one-bit data and one-frame PN code associated with the corresponding channel. The signals outputted from the elements 11a, 12a and 13a are inverted by inverters 11b, 12b and 13b, respectively, thereby obtaining exclusive-OR outputs X1, X2 and X3. The inverters 11b, 12b and 13b are illustrated in order to simplify the following description only, and the strict exclusive-OR elements 11a, 12a and 13a and the corresponding inverters 11b, 12b and 13b constitute the exclusive-OR circuits 11, 12 and 13, respectively.

Phase modulation will be now described. FIG. 4 illustrates signal changes observed when the exclusive-OR outputs X1, X2 and X3 are subjected to binary phase-shift keying. The exclusive-OR outputs X1, X2 and X3 of the respective channels are subjected to binary phase-shift keying (BPSK) at double balanced modulators 41, 42 and 43 by means of the carrier wave $f_L$ on a time-slot basis. Specifically, the signal "1" is modulated to 0-degree phase, and the signal "0" is modulated to 180-degree phase, whereby phase-modulated signals S11, S12 and S13 are obtained. In FIG. 4, the shaded parts represent bits of 180-degree phase, and the unshaded parts represent bits of 0-degree phase.

Synthesis of the phase-modulated signals will be now described. FIG. 5 illustrates a signal change observed when the phase-modulated signals S11, S12 and S13 are synthesized by the synthesizing circuit 60. The phase-modulated signals S11, S12 and S13 of the three channels are synthesized on a time-slot basis (bit-by-bit basis) to obtain a composite signal S20. Namely, the amplitudes of in-phase signals are added up, while the amplitudes of signals having a phase difference of 180 degrees are canceled out. More specifically, since the three channels use the same carrier wave, the amplitude increases where in-phase signals overlap, and signals of opposite phases, when overlapped, cancel out each other. For example, three waves of the same 180-degree phase overlap at bit $b_1$, and thus a composite wave having amplitude "3" is produced, whereas at bit $b_2$, a 0-degree phase composite wave having amplitude "1" is produced because a wave of 180-degree phase overlaps with two waves of 0-degree phase.

FIG. 6 illustrates the polarity and amplitude of the composite signal. Namely, the waveform of the composite signal S20 is expressed by the polarity and amplitude of signal S30. In the graph showing the signal S30, "+1" represents a 0-degree phase wave having amplitude "1", and "+3" represents a 0-degree phase wave having amplitude "3". Similarly, "−1" represents a 180-degree phase wave having amplitude "1", and "−3" represents a 180-degree phase wave having amplitude "3".

Accordingly, the waveform of the transmission signal corresponding to one frame, i.e., $$w = [b7, b6, b5, b4, b3, b2, b1]$$

can be expressed as $$w = [1, 3, 1, -1, -1, 1, -3].$$

A transmission wave having such waveform is transmitted.

FIG. 7 is a block diagram schematically illustrating a receiving side of the code-division multiplex communication apparatus. The receiving side correlates the received signal Sr with each of the PN codes PN1 to PN3. First, the PN codes PN1 to PN3 are modulated at double balanced modulators 41b to 43b, respectively, by means of the carrier wave $f_L$. Using the thus-modulated waves, the received signal Sr is again modulated by each of double balanced modulators 41a to 43a.

The modulated waves obtained in this manner are passed through band-pass filters (BPF) 101, 102 and 103 associated with the respective channels, whereby the results of the correlation corresponding to one frame of PN code are extracted in terms of amplitudes, based on the frequency band characteristics of the band-pass filters which are approximately twice the data rate. The outputs of the filters are passed through PSK demodulators 111 to 113, respectively, thereby demodulating the data D1 to D3.

Code synchronization and carrier-wave synchronization between the receiving and transmitting sides are carried out at the receiving side by methods known in the art. Thus, illustration and description of code synchronization circuit and carrier-wave synchronization circuit are omitted.

Whether the data can be accurately demodulated depends on the results of the correlation.

FIG. 8 illustrates PN codes used for the demodulation, in terms of polarity and amplitude. PN codes PN1 to PN3 associated with the respective channels are identical with the corresponding PN codes used at the transmitting side. Each of the PN codes is subjected to the binary phase-shift keying such that 0-degree phase and 180-degree phase are represented by "1" (unshaded bit in the figure) and "0" (shaded bit), respectively, thus obtaining signals S41 to S43. Further, the 0-degree phase and the 180-degree phase are expressed as "1" and "−1", respectively, whereby signals S51 to S53 are obtained.

Then, the signals S51 to S53 shown in FIG. 8 are each correlated with the signal S30 shown in FIG. 6. This correlation and integration are equivalent to obtaining the inner product of the transmission waveform S30 and each of the PN codes S51 to S53. The value of each inner product represents the amplitude of corresponding demodulated data. The following shows actual correlation with regard to CH1 to CH3:

[CH1]
$$w \cdot PN1 = [1, 3, 1, -1, -1, 1, -3] \cdot$$
$$[1, 1, 1, -1, 1, -1, -1]$$
$$= (1 \cdot 1) + (3 \cdot 1) + (1 \cdot 1) + (-1 \cdot -1) +$$
$$(-1 \cdot 1) + (1 \cdot -1) + (-3 \cdot -1)$$
$$= 1 + 3 + 1 + 1 + (-1) + (-1) + 3 = +7$$

[CH2]
$$w \cdot PN2 = [1, 3, 1, -1, -1, 1, -3] \cdot$$
$$[-1, 1, 1, 1, -1, 1, -1]$$
$$= (-1) + 3 + 1 +$$
$$(-1) + 1 + 1 + 3 = +7$$

[CH3]
$$w \cdot PN3 = [1, 3, 1, -1, -1, 1, -3] \cdot$$
$$[-1, -1, 1, 1, 1, -1, 1]$$
$$= (-1) + (-3) + 1 + (-1) +$$
$$(-1) + (-1) + (-3) = -9$$

Provided that data is "1" if the result of the correlation indicates a positive (+) number, and that data is "0" if the result of the correlation indicates a negative (−) number, then the data of CH1, CH2 and CH3 are "1", "1" and "0", respectively. Thus, the transmitted data can be demodulated.

In the case where the signals of the respective channels are transmitted independently without being multiplexed, and then demodulated, the values of demodulation correlation are +7, +7 and −7, respectively.

Thus, when the composite waveform is transmitted faithfully, the receiving side can acquire demodulated levels that are almost identical to those which would be obtained when the signals are not multiplexed, as long as the PN codes used at the transmitting side are known.

In the above-described code-division multiplex communication apparatus, however, the amplitude, i.e., the electric field strength, of the transmission wave increases in proportion to the number of channels used for the transmission, as seen from FIG. 5. For example, in the aforementioned example, the number of the channels is three, and thus the amplitude is increased by three times.

If, on the other hand, the electric field strength of the transmission wave is to be fixed, the electric field strength per channel must be ⅓ where the number of channels used is three, which leads to a lowering of the SN (signal-to-noise) ratio. Thus, in situations where the electric field strength of a transmission wave is regulated, the SN ratio lowers as the number of channels is increased.

Generally, the electric field strength of the transmission wave is legally regulated, and there is a demand for a transmission apparatus which has as high SN ratio within the regulated range as possible.

Further, the transmission apparatus should preferably be simplified in a circuit arrangement thereof, and there is a particular demand for a transmission apparatus which has high SN ratio and can be used in a radio LAN or FA (factory automation) system dealing with feeble radio waves and installed in an environment involving many noise sources.

SUMMARY OF THE INVENTION

An object of the present invention is to provide a code-division multiplex communication apparatus having a high SN ratio.

Another object of the present invention is to provide a code-division multiplex communication apparatus having a simple circuit arrangement.

Still another object of the present invention is to provide a radio LAN using a code-division multiplex communication apparatus having a high SN ratio.

A further object of the present invention is to provide an FA system using a code-division multiplex communication apparatus having a high SN ratio.

To achieve the above objects, the present invention provides a code-division multiplex transmission apparatus which comprises a plurality of exclusive-OR means provided for respective data channels, for obtaining exclusive ORs based on data input thereto and corresponding pseudo noise codes and for outputting the exclusive ORs, respectively, majority logic means for making a majority logic-based judgment on the exclusive ORs outputted from the exclusive-OR means, and for outputting a majority logic output, and phase modulating means for subjecting the majority logic output to a phase modulation and outputting a phase-modulated signal.

Also provided is a code-division multiplex communication apparatus which comprises a plurality of exclusive-OR means provided for respective data channels, for obtaining exclusive ORs based on data input thereto and corresponding pseudo noise codes and for outputting the exclusive ORs, respectively, majority logic means for making a majority logic-based judgment on the exclusive ORs outputted from the exclusive-OR means, and for outputting a majority logic output, phase modulating means for subjecting the majority logic output to phase modulation and outputting a phase-modulated output, transmitting means for amplifying and modulating the output of the phase modulating means and radiating a resulting signal as a transmission wave, and receiving means for receiving the transmission wave and extracting the data of the respective channels from the transmission wave.

Further, there is provided a radio LAN which comprises a wired LAN, and a workstation or personal computer, each provided with the aforementioned code-division multiplex communication apparatus.

Furthermore, the present invention provides an FA system which comprises an FA computer, and an unmanned carrying vehicle or robot controller, each provided with the aforementioned code-division multiplex communication apparatus.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 12 is a truth table of a three-input majority logic;

FIG. 14 is a chart showing polarity and amplitude of a transmission waveform signal;

DESCRIPTION OF THE PREFERRED EMBODIMENTS

Embodiments of the present invention will be outlined first.

Figure 9:
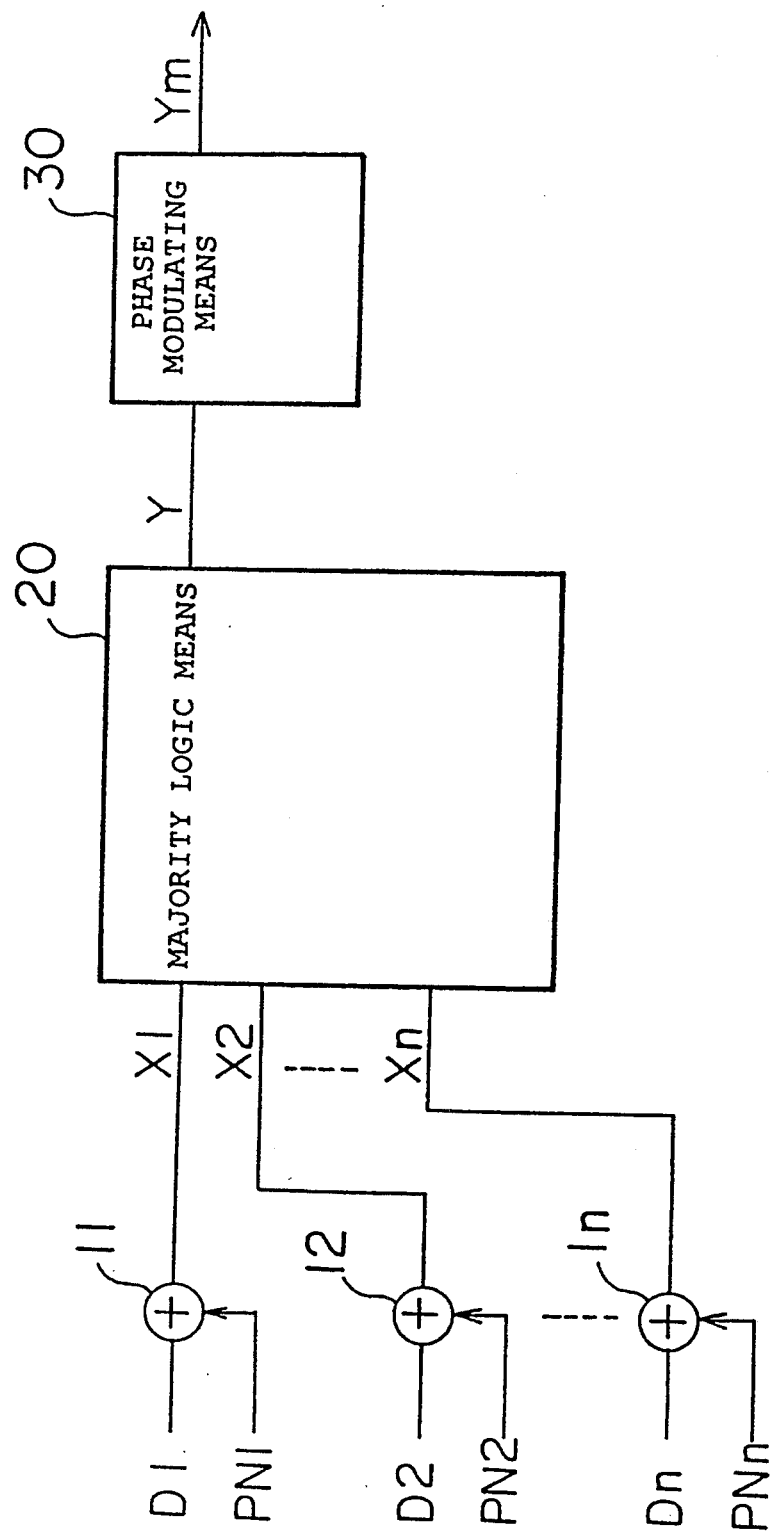
FIG. 9 is a diagram illustrating principles of embodiments according to the present invention.

FIG. 9 illustrates the principles of the invention. As illustrated, the present invention comprises exclusive-OR circuits 11 to in for obtaining exclusive ORs based on data D1 to Dn and corresponding PN codes PN1 to PNn associated with respective channels, majority logic means 20 for subjecting the exclusive-OR outputs X1 to Xn to a majority logic operation and outputting a majority logic output Y, and phase modulating means 30 for subjecting the majority logic output Y to a phase modulation.

The exclusive-OR circuits 11 to in acquire exclusive ORs based on the data D1 to Dn and the corresponding PN codes PN1 to PNn associated with the respective channels. The majority logic means 20 performs a majority logic operation on the exclusive-OR outputs X1 to Xn. Specifically, based on the exclusive-OR outputs X1 to Xn, means 20 compares the number of the outputs representing logical "1" with the number of the outputs representing logical "0", and outputs the logic level "1" or "0" which is greater in number, as the majority logic output Y. The phase modulating means 30 modulates the phase of the majority logic output Y, and transmits the modulated signal as a transmission signal Ym.

The transmission signal Ym is demodulated at a receiving side, thereby demodulating the data D1 to Dn.

As described above, transmission data are subjected to the majority logic operation before transmission, and thus the pulse forming the transmission signal Ym always has a fixed amplitude. Accordingly, any pulse can be transmitted at the identical maximum electric field strength, and the SN ratio can be improved.

The embodiments of the invention will be now described in detail.

Figure 1:
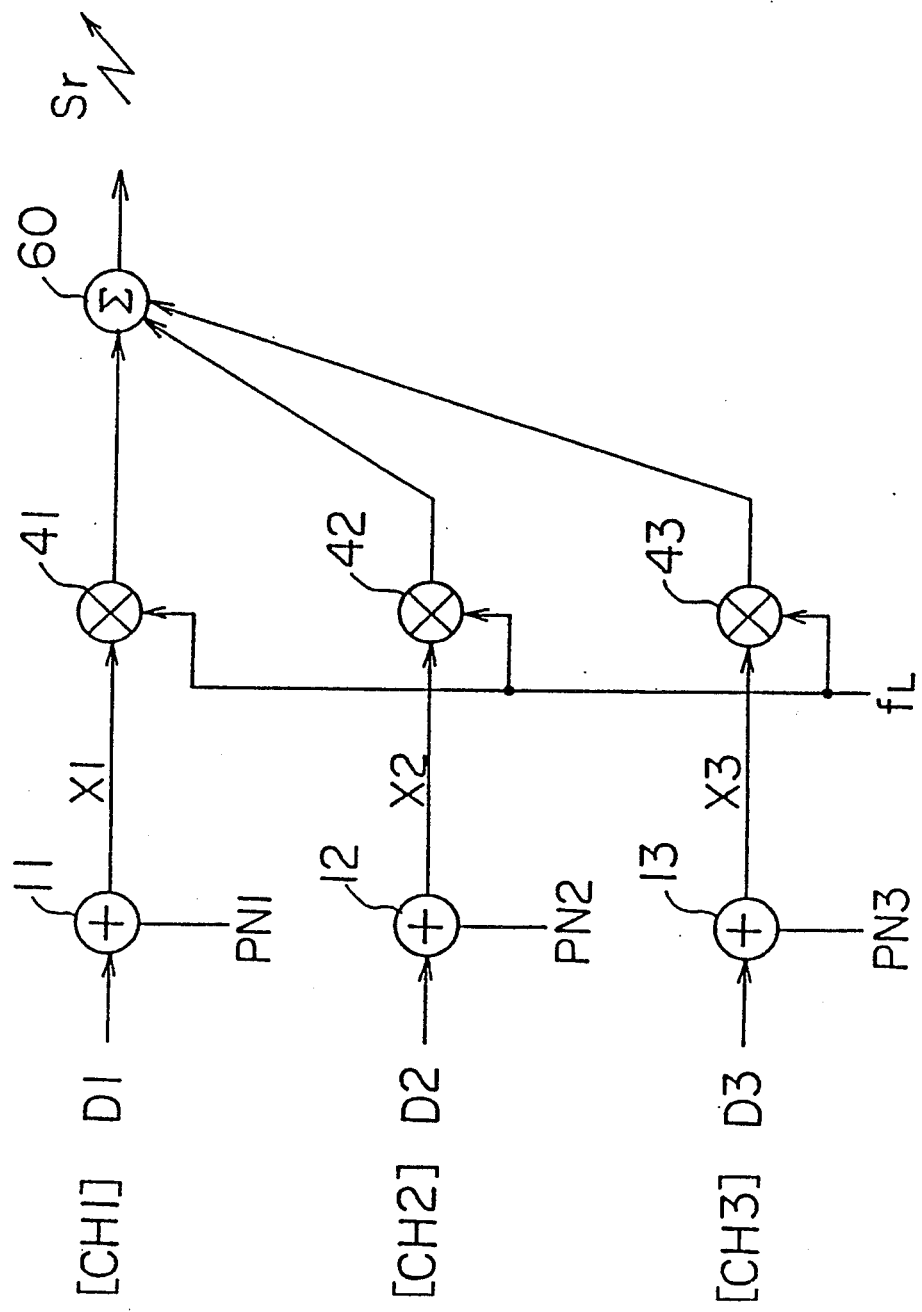
FIG. 1 is a block diagram showing a transmitting side of a conventional code-division multiplex communication apparatus.
Figure 2:
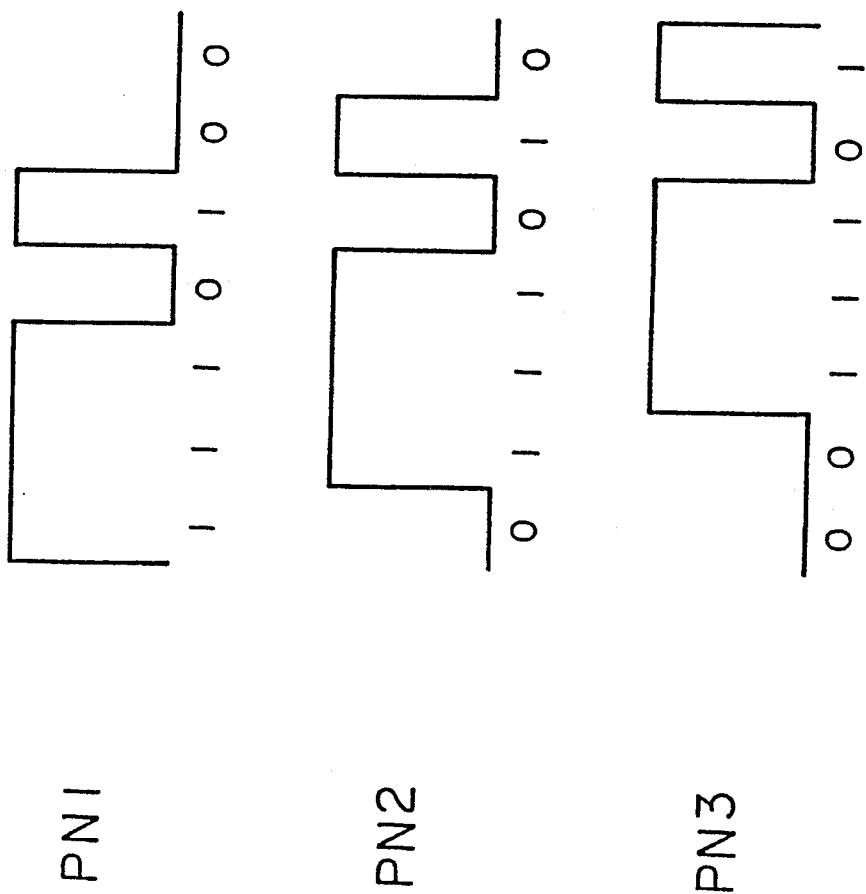
FIG. 2 is a diagram showing an example of PN codes used in the code-division multiplex communication apparatus.
Figure 3:
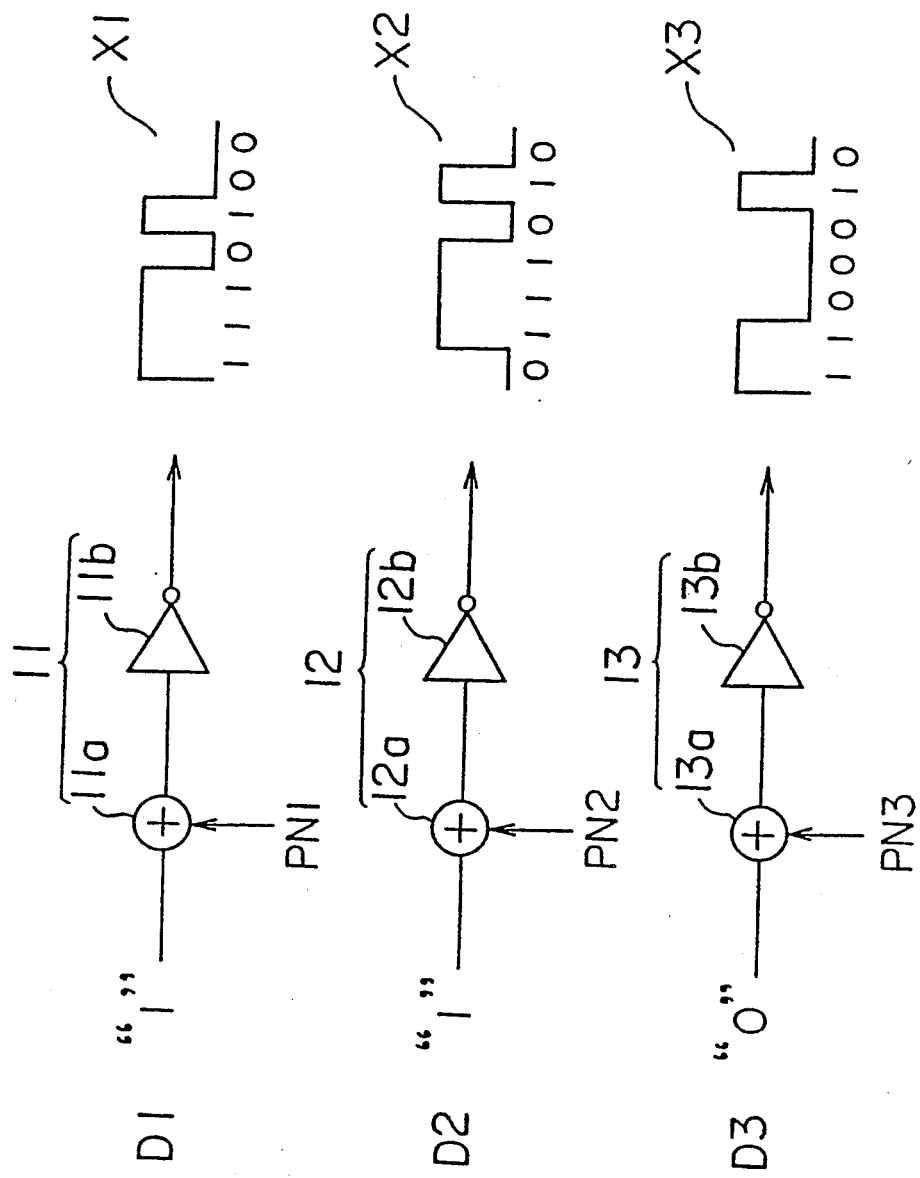
FIG. 3 is a diagram showing an example of how data is modulated using the PN codes.
Figure 4:
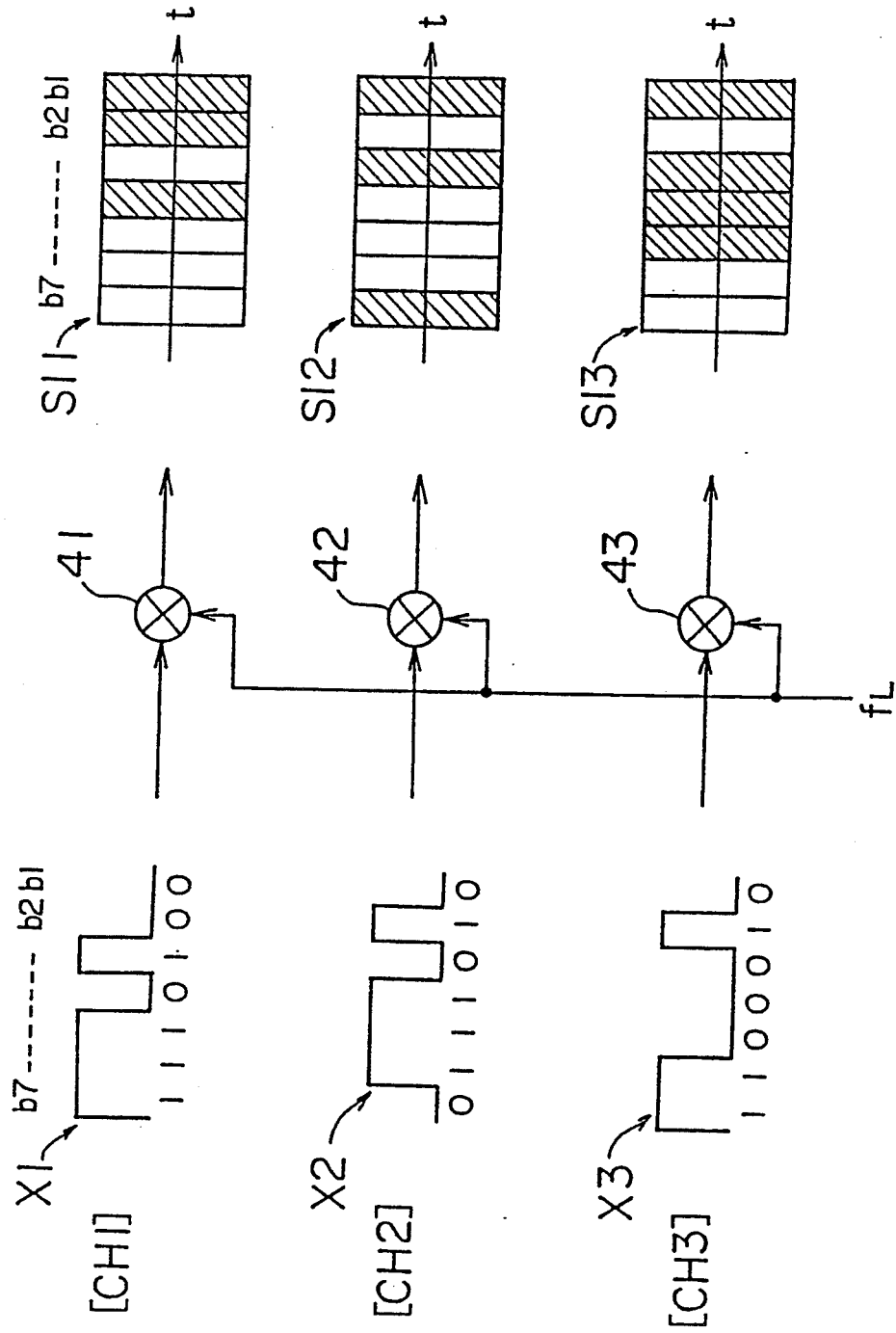
FIG. 4 is a diagram showing signal changes observed when exclusive-OR outputs are subjected to binary phase-shift keying.
Figure 10:
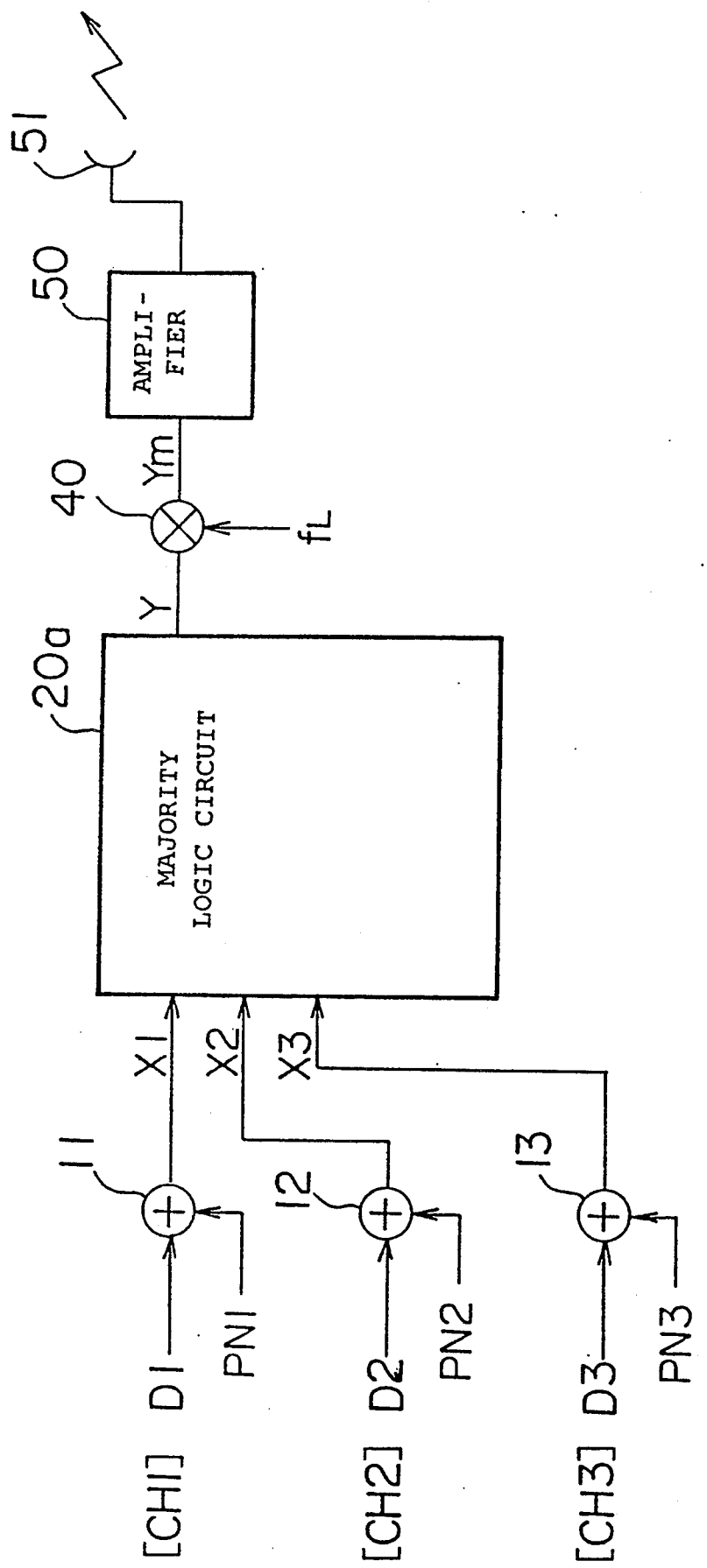
FIG. 10 is a block diagram of a transmitting side of the apparatus according to a first embodiment of the invention.

FIG. 10 is a block diagram of a transmitting side according to a first embodiment. As illustrated, the transmitting side comprises exclusive-OR circuits 11 to 13, a majority logic circuit 20a for carrying out a majority logic operation on the exclusive-OR outputs X1 to X3, a double balanced modulator (DBM) 40 for subjecting the output of the circuit 20a to phase modulation by using a carrier wave $f_L$, an amplifier 50 for amplifying and modulating the output of the modulator 40, and a transmitting aerial 51. The exclusive-OR circuits 11 to 13 are each composed of a strict exclusive-OR element and an inverter, as explained with reference to FIG. 3.

The operation of the transmitting side will be now described. The exclusive-OR circuits 11 to 13 output exclusive ORs based on transmission data D1 to D3 and the corresponding PN codes PN1 to PN3, respectively.

The exclusive-OR outputs X1 to X3 are supplied to the majority logic circuit 20a. The majority logic circuit 20a carries out a majority logic operation on the exclusive-OR outputs X1 to X3, and outputs a majority logic output Y. The arrangement and operation of the majority logic circuit 20a will be described in detail later. The majority logic output Y is subjected to phase modulation at the double balanced modulator 40 by means of the carrier wave $f_L$. The modulated wave Ym is amplified up to a prescribed electric field strength and modulated by the amplifier 50, and then transmitted from the transmitting aerial 51.

Figure 11:
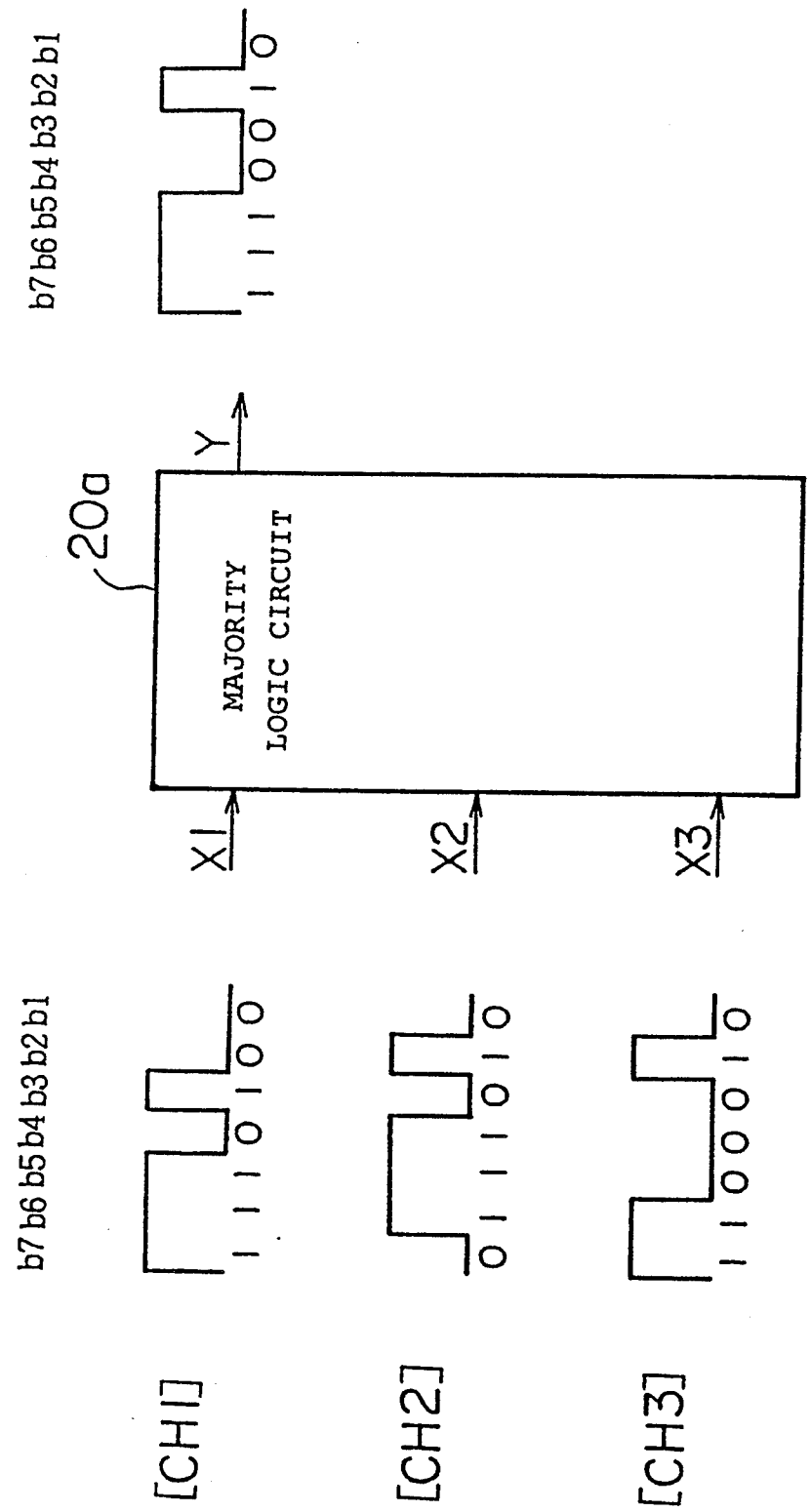
FIG. 11 is a diagram illustrating the input-output relationship of a majority logic circuit.

The operation of the majority logic circuit 20a will be described in detail. FIG. 11 illustrates the input-output relationship of the majority logic circuit 20a. The majority logic circuit 20a is supplied with the exclusive-OR outputs X1 to X3, and performs a majority logic operation on a time-slot (bit-by-bit) basis. If the signals supplied in parallel via the channels indicate a majority of "1", then the circuit 20a outputs "1"; if the input signals indicate a majority of "0", the circuit 20a outputs "0". For example, in the case of the least significant bits $b_1$ of the inputs X1, X2 and X3, the output signal is "0" because the corresponding data of CH1 to CH3 are all "0". For the bits b2, the data of CH1 is "0" while the data of CH2 and CH3 are "1". In this case, the output signal is "1" because "1" has a majority.

FIG. 12 illustrates a truth table of the three-input majority logic. In the table, X1, X2 and X3 represent inputs, respectively, and Y represents the majority logic output.

Figure 13:
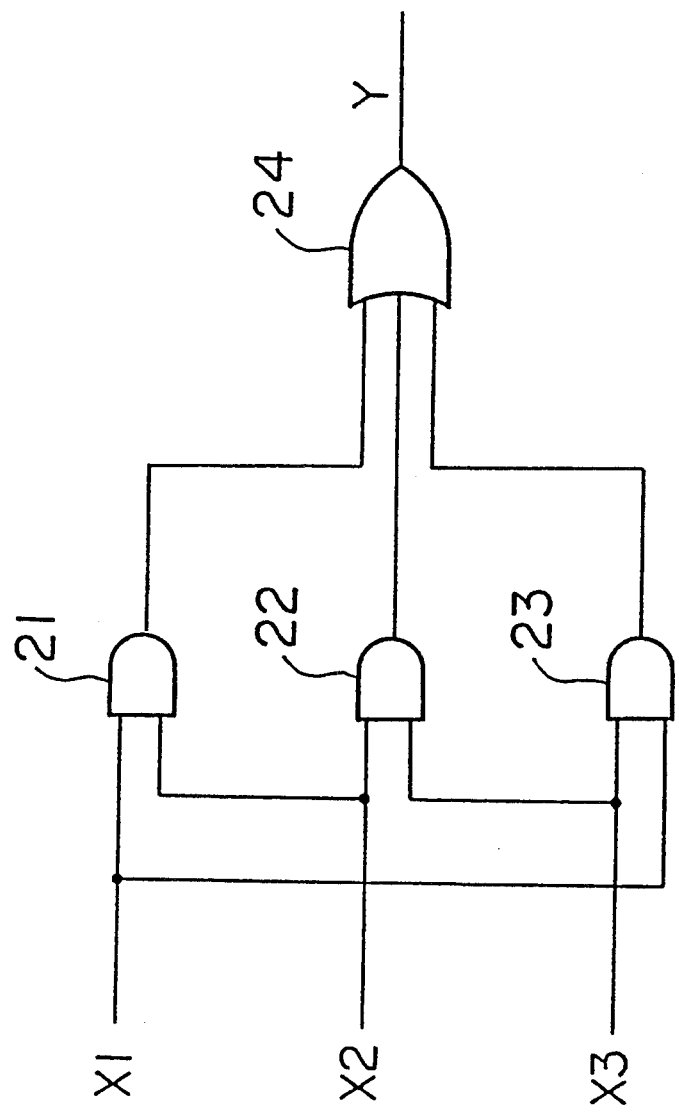
FIG. 13 is a diagram illustrating a specific arrangement of a three-input majority logic circuit.

A specific arrangement of the majority logic circuit 20a will be now described. FIG. 13 illustrates the arrangement of a three-input majority logic circuit. The circuit comprises three AND elements 21, 22 and 23 and an OR element 24. In cases where the data channels used are n in number, the elements are combined in a similar manner to form the circuit. To make the majority logic circuit operate properly, however, the number of the channels, n, must be an odd number, to thereby avoid situations where the input logical "1" and "0" become equal in number.

Figure 6:
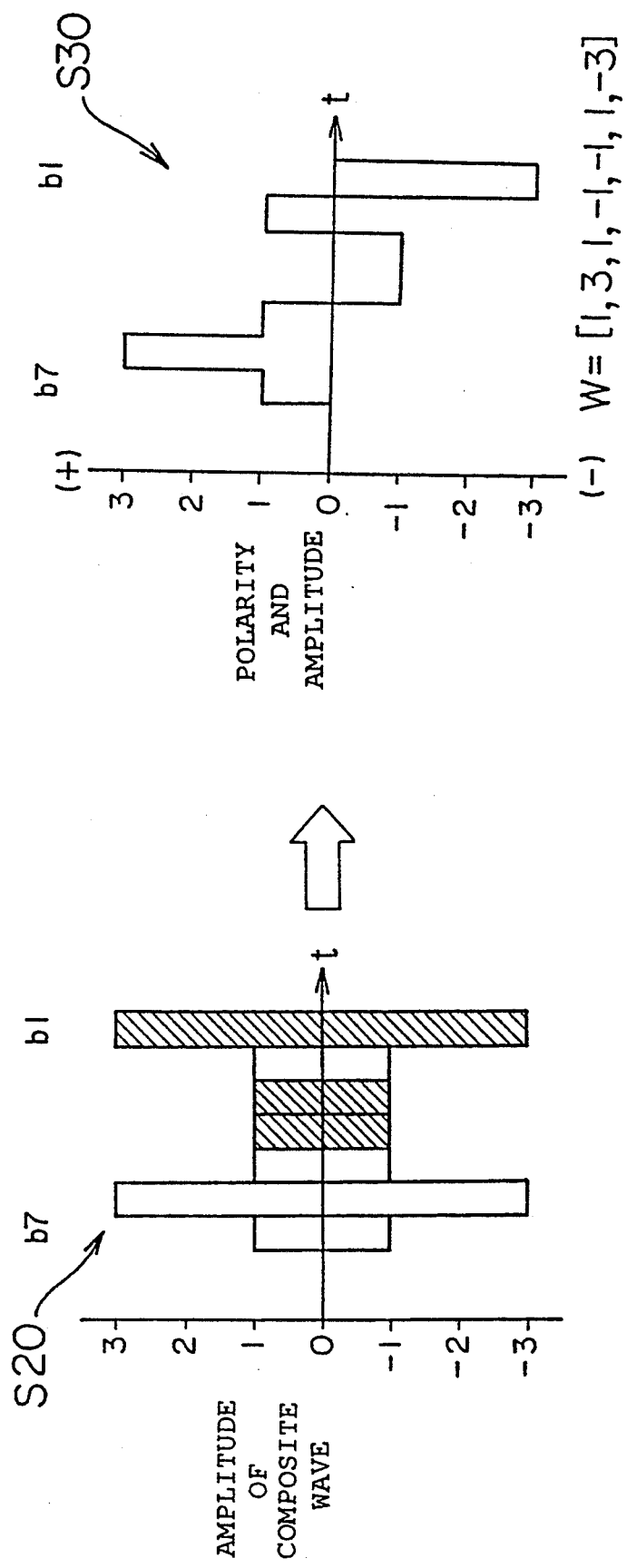
FIG. 6 is a chart showing polarity and amplitude of a composite signal.

The following is a description of a receiving side of the code-division multiplex communication apparatus for receiving the wave transmitted from the above-described transmitting side of the first embodiment. The electric field strength of the transmission signal has been raised to the prescribed electric field strength, and every pulse in the signal is transmitted at the identical maximum electric field strength, as mentioned above. Namely, all pulses constituting the transmission signal have an amplitude equivalent to amplitude "3" of the signal S30 shown in FIG. 6.

FIG. 14 illustrates polarity and amplitude of signals with the transmission waveform obtained by the first embodiment. That is, signals S1 and S2 of FIG. 14 correspond to the signals S20 and S30 of FIG. 6, respectively.

Accordingly, waveform $w_2$ of the transmitted signal can be expressed by the following formula:

$$w_2 = 3 \sim [1, 1, 1, -1, -1, 1, -1].$$

Figure 7:
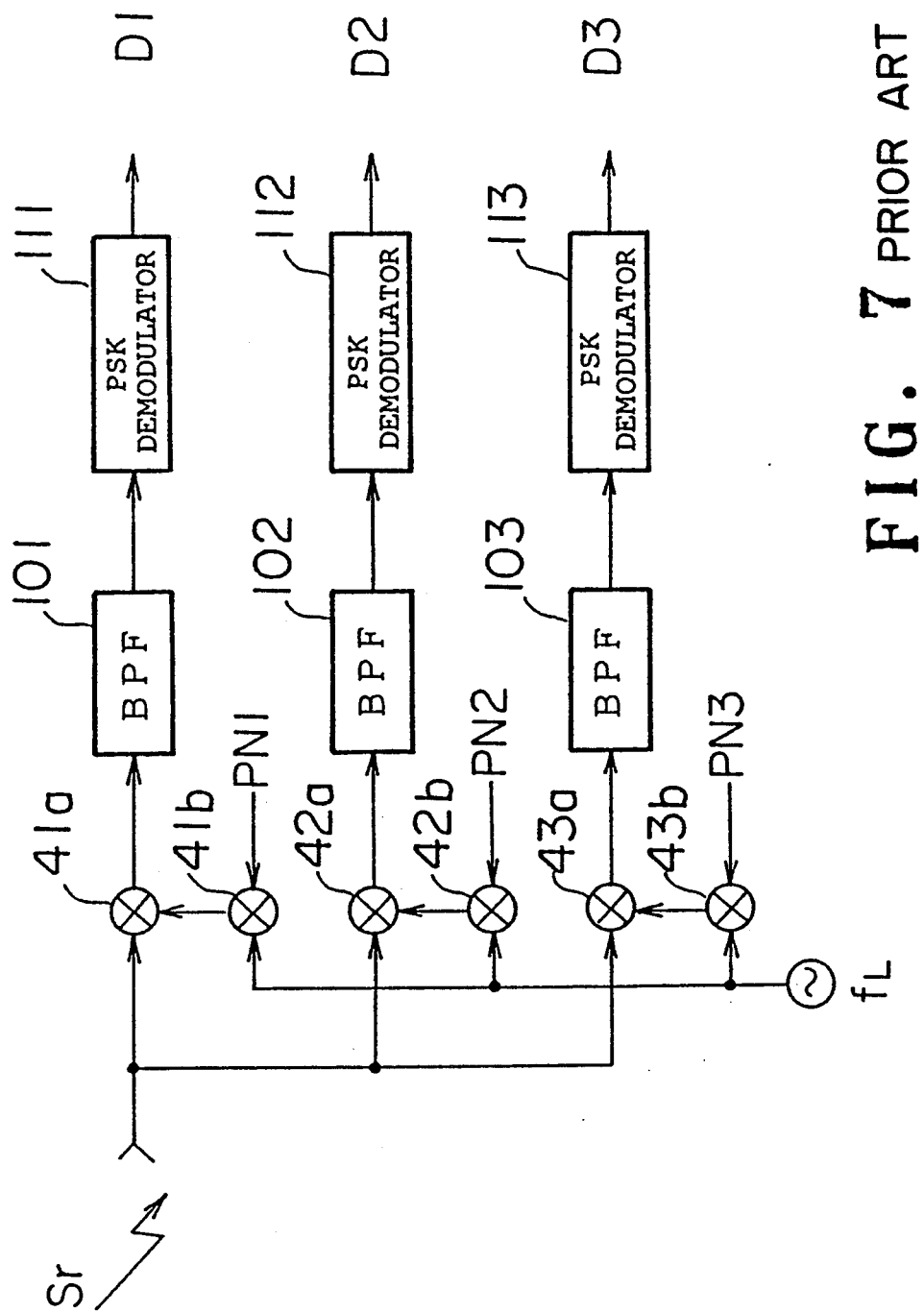
FIG. 7 is a block diagram schematically showing a receiving side of the code-division multiplex communication apparatus.
Figure 8:
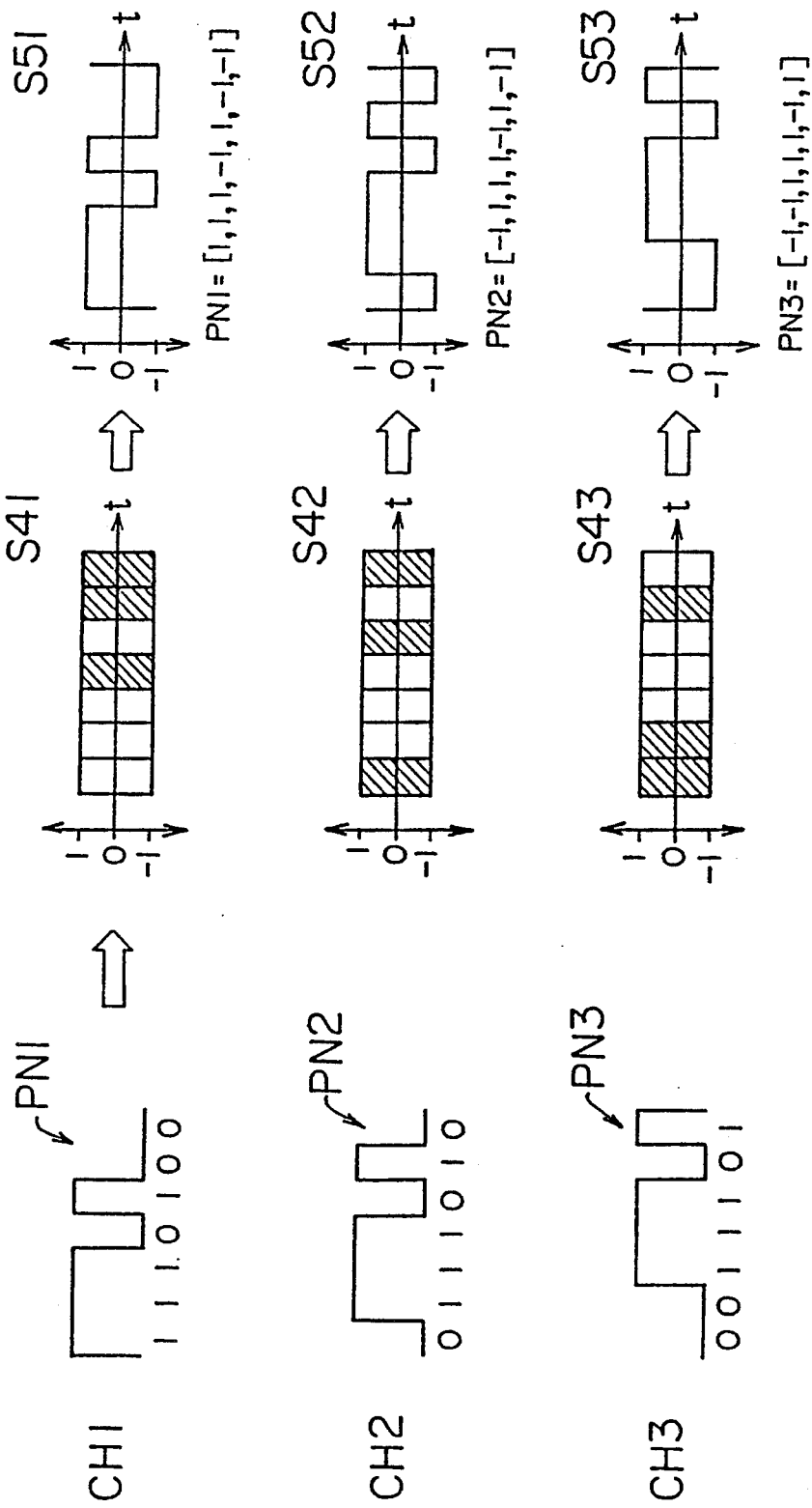
FIG. 8 is a diagram showing polarity and amplitude of PN codes used for demodulation.

Upon receiving the waveform, the receiving side carries out correlation, followed by integration. Specifically, the inner product of the received signal and each of the PN codes is obtained. The arrangement of the receiving side is identical to that shown in FIG. 7.

[CH1]
$$\begin{aligned} w_2 \cdot PN1 &= 3 \cdot [1, 1, 1, -1, -1, 1, -1] \cdot \\ & \quad [1, 1, 1, -1, 1, -1, -1] \\ &= 3 \cdot [1 + 1 + 1 + 1 + \\ & \quad (-1) + (-1) + 1] = +9 \end{aligned}$$

[CH2]
$$\begin{aligned} w_2 \cdot PN2 &= 3 \cdot [1, 1, 1, -1, -1, 1, -1] \cdot \\ & \quad [-1, 1, 1, 1, -1, 1, -1] \\ &= 3 \cdot [(-1) + 1 + 1 + \\ & \quad (-1) + 1 + 1 + 1] = +9 \end{aligned}$$

[CH3]
$$\begin{aligned} w_2 \cdot PN3 &= 3 \cdot [1, 1, 1, -1, -1, 1, -1] \cdot \\ & \quad [-1, -1, 1, 1, 1, -1, 1] \\ &= 3 \cdot [(-1) + (-1) + 1 + \\ & \quad (-1) + (-1) + (-1) + (-1)] \\ &= -15 \end{aligned}$$

In the above case, the data D1 represents "1" because the sign of the obtained inner product of CH1 is "+", the data D2 represents "1" because the sign of the inner product of CH2 is "+", and the data D3 represents "0" because the sign of the inner product of CH3 is "−". Namely, the data transmitted via CH1 to CH3 are "1", "1" and "0" respectively.

Thus, the transmitting side merely transmits the majority information, and the receiving side can decode the transmitted data. Since only the majority information is transmitted, the amplitude, i.e., the electric field strength, of the transmitted wave does not substantially increase even if the number of multiplexed channels is increased. Accordingly, the SN ratio is not decreased and can be maintained constant, unlike the conventional apparatus, thus making it possible to provide a code-division multiplex communication apparatus which is particularly effective in an environment wherein the electric field strength of transmission wave is regulated.

For the purpose of quantitative comparison with the conventional apparatus, the total of absolute values of the channels will be used. Specifically, in the case of the conventional apparatus of three-channel type, the total of correlation values, Co, is given as follows:

$$Co = 7 + 7 + |-9| = 23.$$

According to the first embodiment, by contrast, the total Cn of the correlation values is:

$$Cn = 9 + 9 + |-15| = 33.$$

Since the SN ratio approximately corresponds to the total of correlation values, it can be said that the SN ratio is increased by an amount corresponding to the difference given above.

Although the description of the first embodiment is directed to a three-channel type apparatus, similar advantages can be obtained if the number of channels is increased. For example, in the case of a five-channel type, the total of correlation values of the conventional apparatus is 39, whereas the total of correlation values of the apparatus according to the first embodiment is 65. Further, in the case of a seven-channel type, the total of correlation values of the conventional apparatus is 55, whereas the total of correlation values of the apparatus according to the first embodiment is 91. When the number of channels is increased, however, the code length of the individual PN codes need be increased.

Furthermore, as seen from FIG. 10, the double balanced modulator 40 to be used is always one, regardless of the number of channels. Moreover, since the circuits at the stages preceding the double balanced modulator 40 are all digital circuits, the circuitry can be easily constructed by a programmable logic device (PLD), and the communication system can be modified easily.

Figure 15:
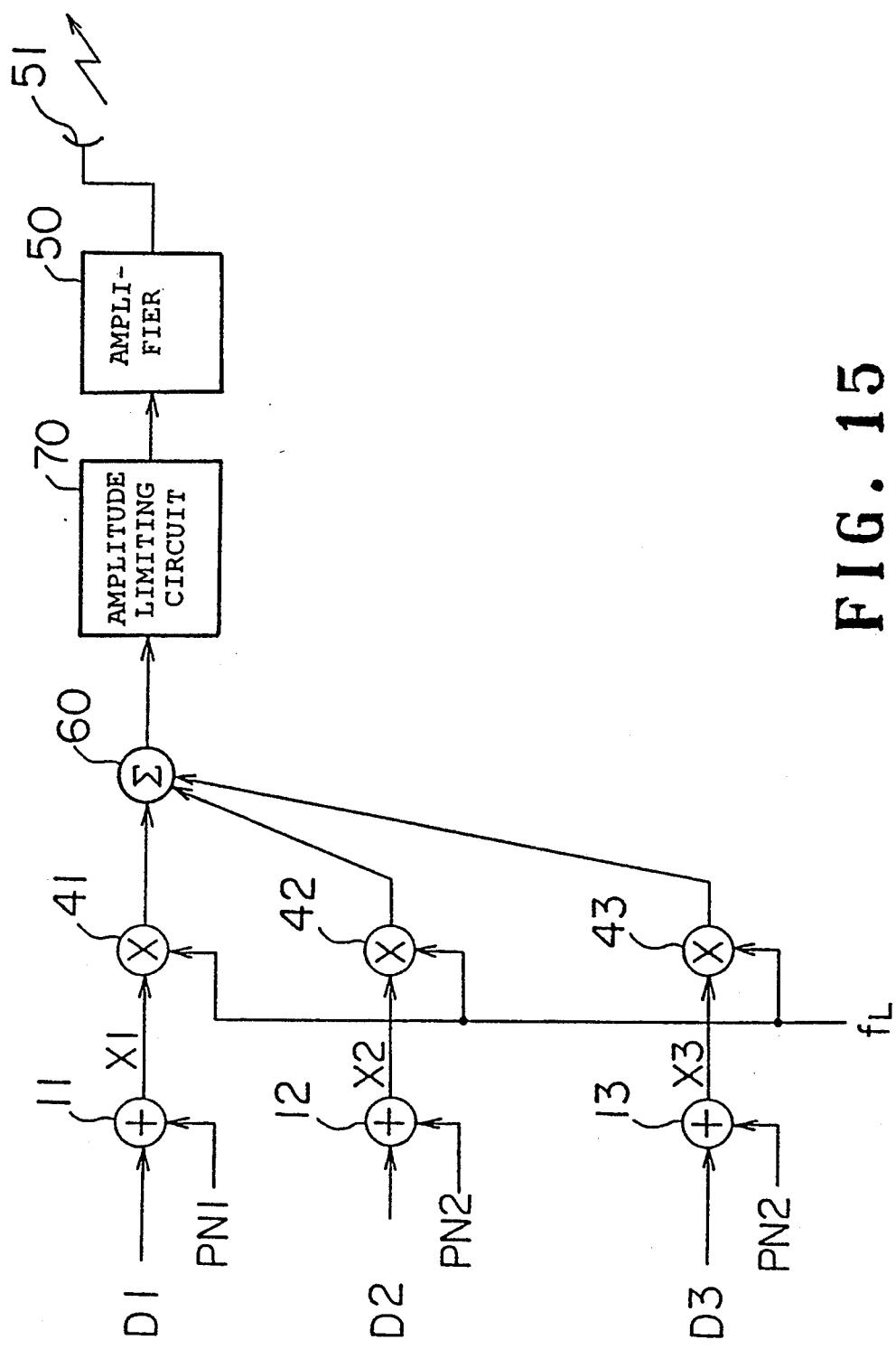
FIG. 15 is a block diagram of a transmitting side of the apparatus according to a second embodiment of the invention.

FIG. 15 is a block diagram of a transmitting side of the apparatus according to a second embodiment. The second embodiment comprises exclusive-OR circuits 11 to 13, double balanced modulators 41 to 43 for subjecting the exclusive-OR outputs X1 to X3 to phase modulation, respectively, a synthesizing circuit 60 for synthesizing the modulated signals in an analog mode, an amplitude limiting circuit 70 for limiting the amplitude of the composite output of the synthesizing circuit 60, an amplifier 50 for amplifying and modulating the output of the amplitude limiting circuit 70, and an aerial 51 for transmitting the output of the amplifier.

The second embodiment differs from the first embodiment in that the synthesizing circuit 60 and the amplitude limiting circuit 70 constitute the majority logic means, and that the double balanced modulators 41 to 43 are arranged at different locations. Specifically, the double balanced modulators 41 to 43 are connected following the exclusive-OR circuits 11 to 13, respectively, in a manner associated with the respective channels, and the outputs of the modulators are supplied to the synthesizing circuit 60.

The operation of the second embodiment will be now described. The exclusive-OR circuits 11 to 13 output exclusive ORs based on transmission data D1 to D3 and the corresponding PN codes PN1 to PN3, respectively. The exclusive-OR outputs X1 to X3 are subjected to phase modulation by means of the carrier wave $f_L$ at the double balanced modulators 41 to 43, respectively. The modulated signals of the respective channels are synthesized by the synthesizing circuit 60 in an analog mode. The resulting composite signal which has an amplitude thereof limited by the amplitude limiting circuit 70, is amplified up to the prescribed electric field strength and modulated by the amplifier 50, and then transmitted from the aerial 51. The arrangement of the amplitude limiting circuit 70 will be described in detail later.

Figure 5:
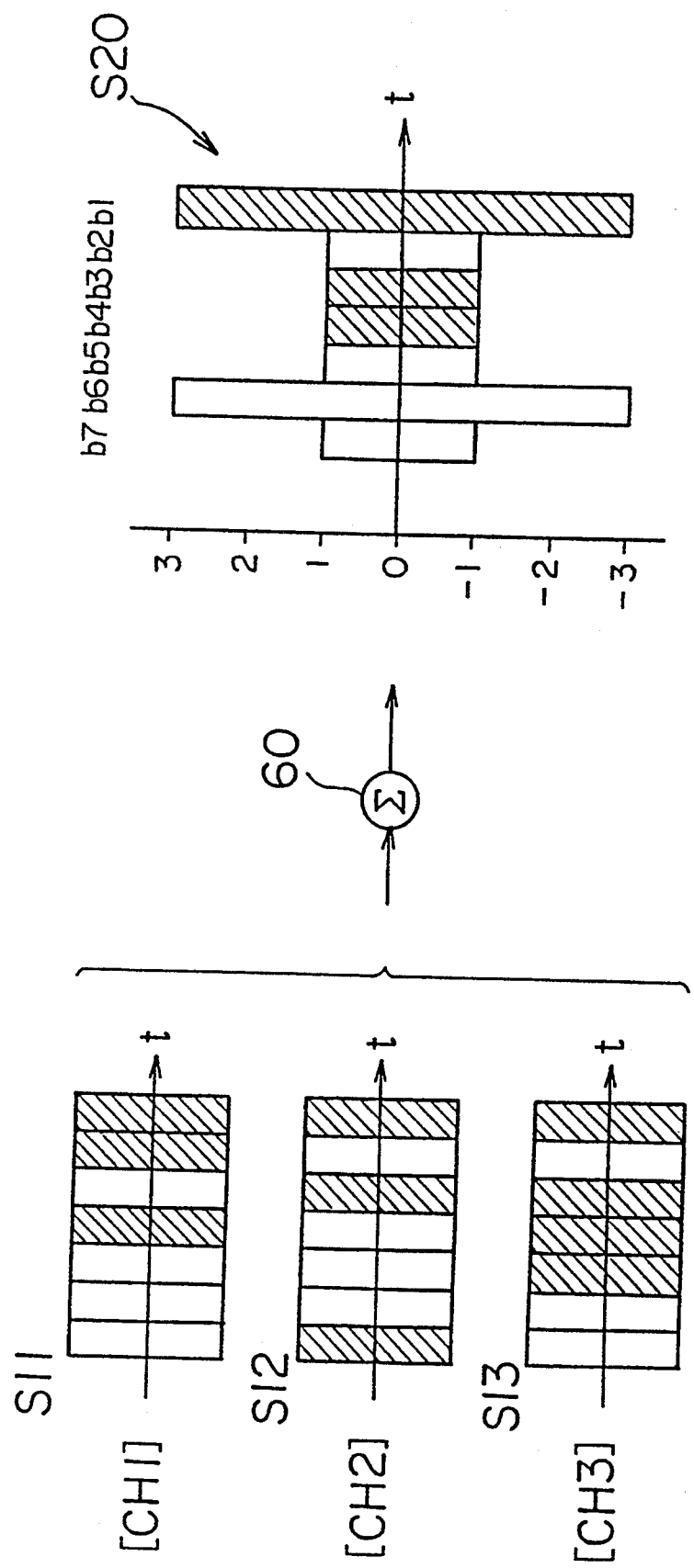
FIG. 5 is a diagram showing a signal change observed when phase-modulated signals are synthesized by a synthesizing circuit.

The following explains that the operation achieved by the synthesizing circuit 60 and the amplitude limiting circuit 70 is equivalent to that of the majority logic circuit 20a of the first embodiment. Comparison between the majority logic-based signal S1 shown in FIG. 14 and the composite signal S20 shown in FIG. 5, obtained by synthesizing the exclusive-OR outputs S11 to S13 based on the data of the channels and the corresponding PN codes, reveals that the signal S1 of FIG. 14 differs from the composite signal S20 only in amplitude. Accordingly, if the amplitude of the composite signal S20 shown in FIG. 5 is fixed, then the signal S1 shown in FIG. 14, i.e., majority logic output signal, can be obtained.

Based on this idea, the second embodiment is configured as shown in FIG. 15. In this arrangement, the synthesizing circuit 60 outputs a signal similar to the signal S20 shown in FIG. 5, and the amplitude of this signal is limited by the amplitude limiting circuit 70, thereby obtaining the signal S1 shown in FIG. 14.

Figure 16:
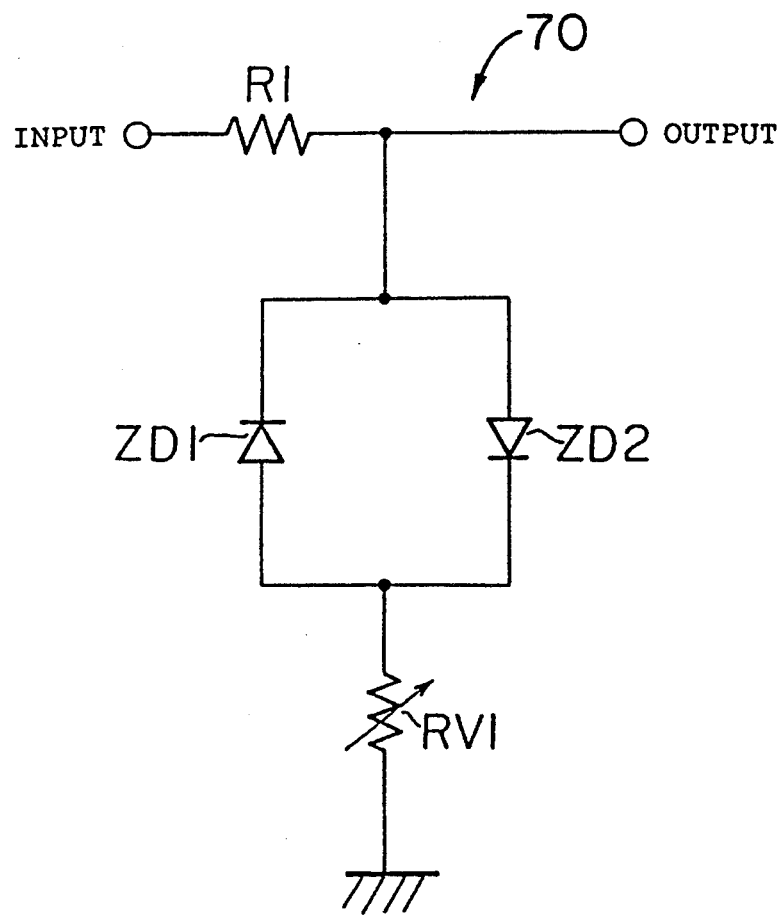
FIG. 16 is a circuit diagram showing a first example of an amplitude limiting circuit.

The arrangement of the amplitude limiting circuit 70 will be now described in detail. FIG. 16 illustrates a first example of the amplitude limiting circuit 70. The amplitude limiting circuit comprises a Zener diode circuit including Zener diodes ZD1 and ZD2 connected in an inverse-parallel fashion, i.e., connected in parallel with their polarities directed in opposite directions, a fixed resistor R1 connected to the input of the Zener diode circuit, and a variable resistor RV1 connected to the ground terminal of the Zener diode circuit. The output signal is limited approximately to the Zener voltage determined by the Zener diodes ZD1 and ZD2. The output voltage can be finely controlled through adjustment of the variable resistor RV1, and the illustrated amplitude limiting circuit can deal with signals of up to about several hundreds of megahertz.

Figure 17:
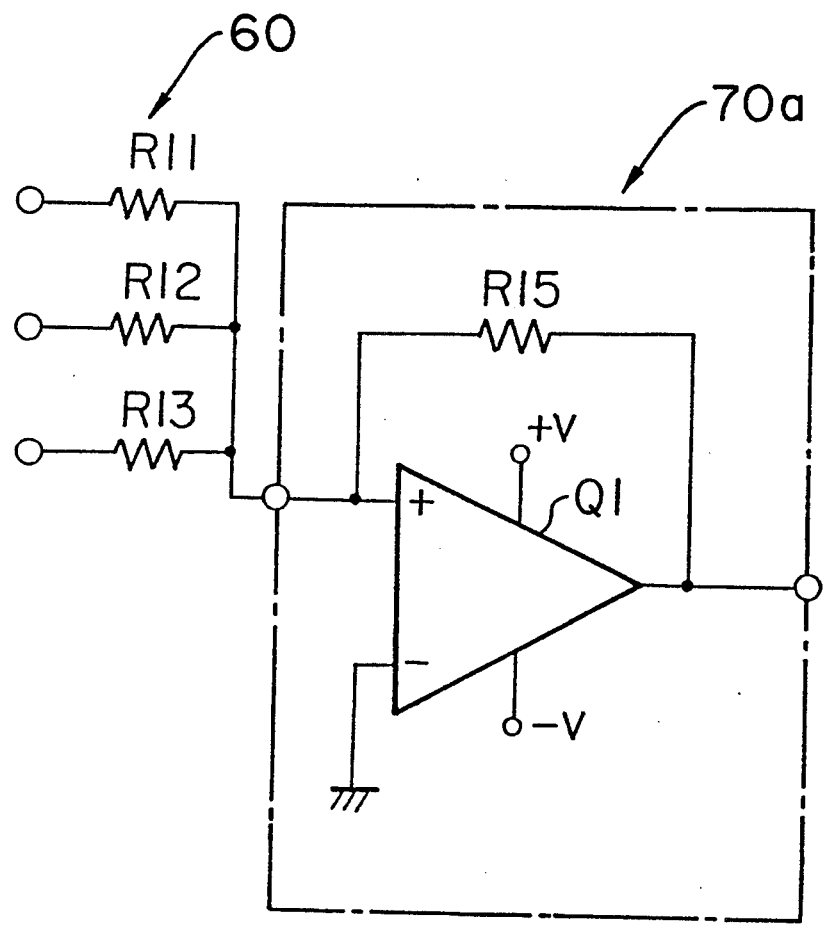
FIG. 17 is a circuit diagram showing a second example of the amplitude limiting circuit and a synthesizing circuit.

An example of the synthesizing circuit 60 and a second example of the amplitude limiting circuit 70 will be described. FIG. 17 is a circuit diagram showing a synthesizing circuit 60 and an amplitude limiting circuit 70a using an operational amplifier. An operational amplifier Q1 is connected at the input side thereof to input resistors R11 to R13, and connected at output side to an output resistor R15.

If the resistance values of the input resistors R11 to R13 are made equal to one another, then the inputs to the resistors are synthesized in an analog mode, whereby the input resistors R11 to R13 function as the synthesizing circuit. Since the output of the operational amplifier Q1 does not deviate from its supply voltage range between V and −V, the amplifier Q1 functions as the amplitude limiting circuit. This circuit can deal with signals of up to about 10 MHz.

Figure 18:
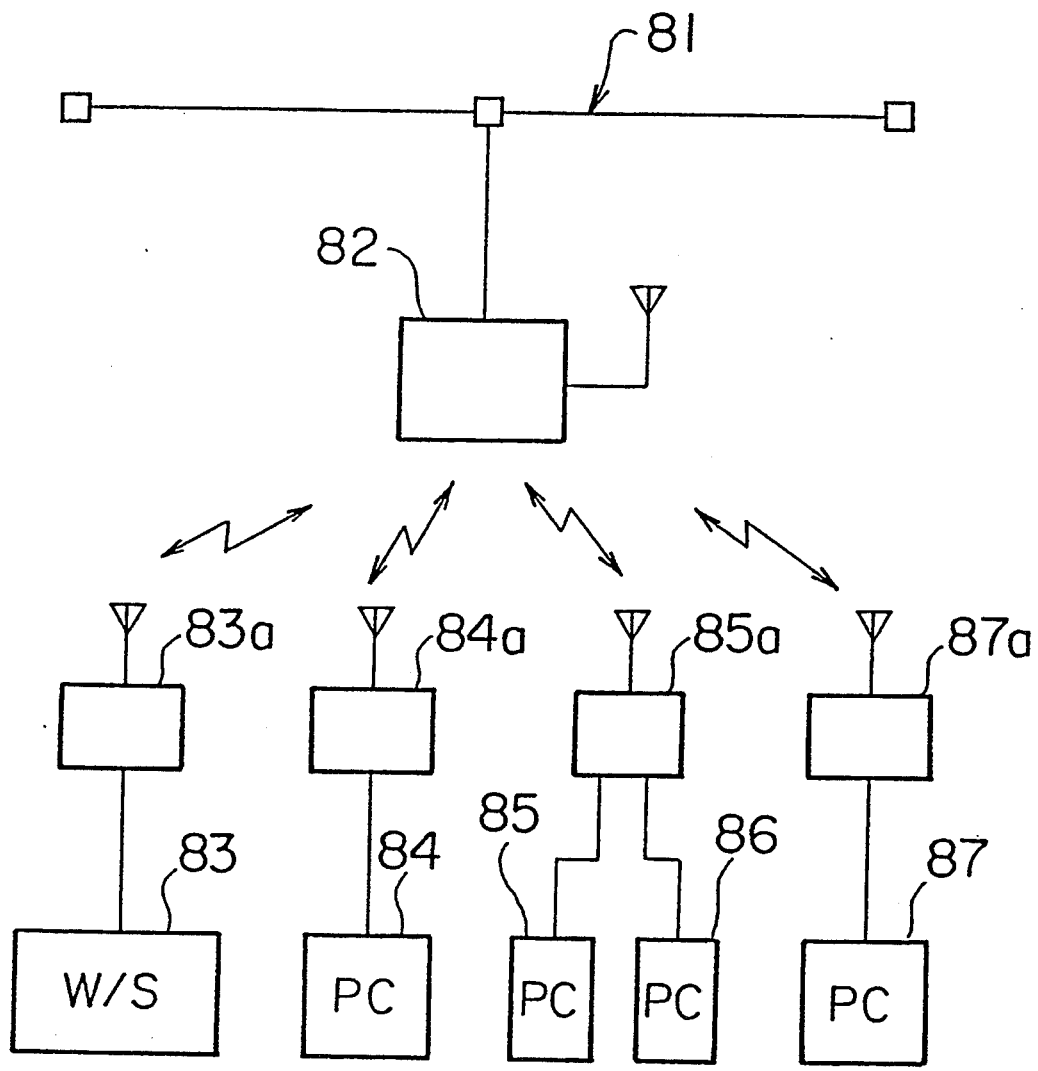
FIG. 18 is a diagram showing the configuration of a radio LAN to which a code-division multiplex communication apparatus according to the present invention is applied.

The following is a description of a system to which the code-division multiplex communication apparatus according to the present invention is applied. A first example of such system is a radio LAN. FIG. 18 illustrates the configuration of a radio LAN using the code-division multiplex communication apparatus according to the present invention. The radio LAN comprises a transmitter-receiver 82 connected to a wired LAN 81, a workstation 83 having a transmitter-receiver 83a, and personal computers 84, 85, 86 and 87 connected to transmitters-receivers 84a, 85a and 87a. The personal computers 85 and 86 share the transmitter-receiver 85a. Each of the transmitters-receivers 82, 83a, 84a, 85a and 87a has a built-in transmitter having the arrangement shown in FIG. 10 and a built-in receiver having the arrangement shown in FIG. 7.

The wired LAN 81 is connected to the workstation 83 and personal computers 84 to 87 by means of radio communication, to exchange information including image data therebetween. Thus, the workstation 83 and the personal computers 84 to 87 constitute a LAN in cooperation with the wired LAN 81, whereby a radio LAN having high SN ratio can be constructed by using the code-division multiplex communication apparatus according to the present invention.

Figure 19:
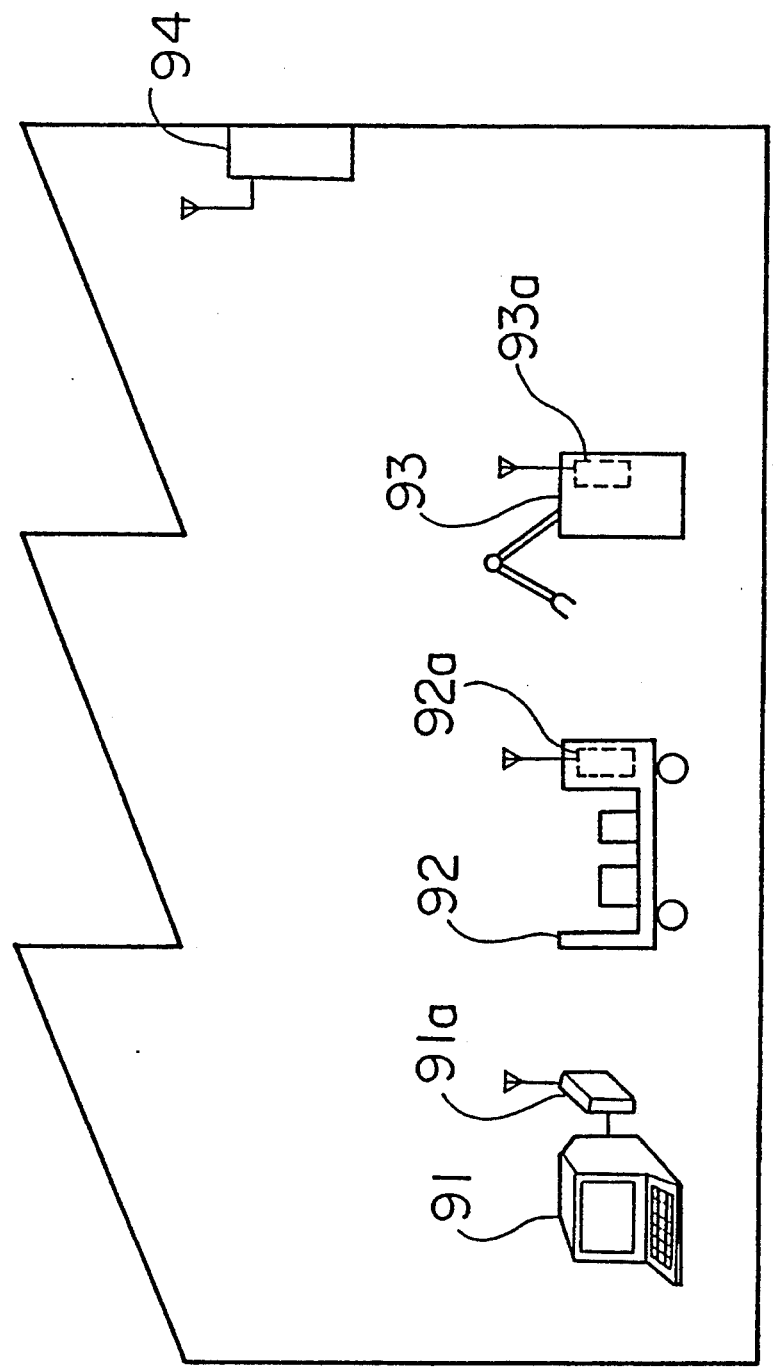
FIG. 19 is a diagram showing the configuration of an FA system to which the code-division multiplex communication apparatus according to the present invention is applied.

A second example of a system using the code-division multiplex communication apparatus according to the present invention will be described. FIG. 19 illustrates the configuration of an FA (factory automation) system using the code-division multiplex communication apparatus according to the present invention. The FA system comprises an FA computer 91, an unmanned carrying vehicle 92, a robot controller 93, etc. The elements 91, 92 and 93 are provided with transmitters-receivers 91a, 92a and 93a, respectively, each including a transmitter having the arrangement shown in FIG. 10 and a receiver having the arrangement shown in FIG. 7. These transmitters-receivers are connected to one another via a radio relay telemeter 94. Using the transmitters-receivers 91a, 92a and 93a, the FA computer 91 outputs a command to move the unmanned carrying vehicle 92, the vehicle 92 notifies a current position thereof, etc. to the FA computer 91, the FA computer 91 transmits robot motion commands to the robot controller 93, and the robot controller 93 transmits operation status, failure, etc. of the robot to the FA computer 91. The information transmitted between the FA computer 91, the unmanned carrying vehicle 92 and the robot controller 93 includes image data.

Usually, there are many devices producing noises in a factory in which the FA system as described above is installed, and communication by means of the code-division multiplex communication apparatus having high SN ratio is particularly useful in such situations.

In the foregoing, only two examples of using the code-division multiplex communication apparatus according to the present invention are described, but the invention has a wide variety of other applications.

As described above, a majority logic output is obtained from a plurality of exclusive-OR outputs each based on data and the PN code, and then transmitted, and accordingly, a code-division multiplex communication apparatus having high SN ratio can be obtained. The improvement of the SN ratio is particularly noticeable where the number of channels is increased and thus the number of signals to be multiplexed becomes large.

Further, the use of the majority logic means permits the number of double balanced modulators at the transmitting side to be reduced and the circuit arrangement to be simplified, compared with the conventional apparatus. Particularly, in the case where the majority logic means is constituted by a logic circuit, the circuitry can be easily formed by a PLD etc. because only logic elements are required.

Furthermore, where the code-division multiplex communication apparatus of the present invention is applied to radio LAN, a radio LAN having high SN ratio can be constructed.

Moreover, by applying the code-division multiplex communication apparatus of the present invention to the FA system, it is possible to construct an FA system which is equipped with a high SN-ratio radio communication apparatus and which stands the use in a high noise-level environment.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A code-division multiplex transmission apparatus for multiplexing data by using pseudo noise codes for transmission, comprising:
   n exclusive-OR means provided for respective data channels, n being an odd number, said exclusive-OR means producing exclusive ORs based on data input thereto and corresponding pseudo noise codes and outputting the exclusive ORs, respectively;
   majority logic means for making a majority logic-based judgment on the exclusive ORs outputted from said exclusive-OR means, and for outputting a majority logic output; and
   phase modulating means, coupled to said majority logic means, for subjecting the majority logic output to phase modulation and outputting a phase-modulated signal.

2. The code-division multiplex transmission apparatus according to claim 1, wherein said majority logic means comprises a circuit including at least one AND element receiving said exclusive ORs and an OR element receiving an output of said at least one AND element and outputting said majority logic output.

3. The code-division multiplex transmission apparatus according to claim 1, wherein said majority logic means comprises a synthesizing circuit for synthesizing said exclusive ORs in an analog mode, and an amplitude limiting circuit, coupled to said synthesizing circuit, for limiting the amplitude of a composite signal output from the synthesizing circuit.

4. The code-division multiplex transmission apparatus according to claim 3, wherein said amplitude limiting circuit comprises a fixed resistor connected to said synthesizing circuit at one end thereof, a Zener diode circuit having an input connected to another end of said fixed resistor and including two Zener diodes connected in parallel with polarities thereof directed in opposite directions, and a variable resistor connected to a ground side of said Zener diode circuit.

5. The code-division multiplex transmission apparatus according to claim 3, wherein said synthesizing circuit comprises a plurality of resistors provided for the respective data channels and having output terminals thereof connected together, and said amplitude limiting circuit comprises an operational amplifier having an input terminal connected to the resistors, the operational amplifier limiting the amplitude of a signal input thereto to a power-supply voltage value thereof.

6. The code-division multiplex transmission apparatus according to claim 1, wherein said phase modulating means carries out binary phase-shift keying (BPSK).

7. The code-division multiplex transmission apparatus according to claim 1, wherein said data channels comprise an odd number of data channels.

8. A code-division multiplex communication apparatus for carrying out multiplex communication by using pseudo noise codes, comprising:
   n exclusive-OR means provided for respective data channels, n being an odd number, said exclusive OR means producing exclusive ORs based on data input thereto and corresponding pseudo noise codes and outputting the exclusive ORs, respectively;
   majority logic means for making a majority logic-based judgment on the exclusive ORs outputted from said exclusive-OR means, and for outputting a majority logic output;
   phase modulating means, coupled to said majority logic means, for subjecting the majority logic output to phase modulation and outputting a phase-modulated output;
   transmitting means for amplifying and modulating the output of the phase modulating means and radiating a resulting signal as a transmission wave; and receiving means for receiving a transmission wave and extracting the data of the respective channels from the transmission wave.

9. A radio LAN comprising:

a wired LAN provided with a transmitter-receiver for transmitting and receiving data by using pseudo noise codes, said transmitter-receiver including n exclusive-OR means provided for respective data channels, n being an odd number, said exclusive-OR means producing exclusive ORs based on data input thereto and corresponding pseudo noise codes and outputting the exclusive ORs, respectively, majority logic means for making a majority logic-based judgment on the exclusive ORs output from said exclusive-OR means and for outputting a majority logic output, phase modulating means for subjecting the majority logic output to phase modulation and outputting a phase-modulated output, transmitting means for amplifying and modulating the output of the phase modulating means and radiating a resulting signal as a transmission wave, and receiving means for receiving a transmission wave and extracting the data of the respective channels from the transmission wave; and a workstation or personal computer provided with a transmitter-receiver having an arrangement identical to that of said transmitter-receiver.

10. The radio LAN according to claim 9, wherein said data includes image data.

11. An FA system comprising:

an FA computer provided with a transmitter-receiver for transmitting and receiving data by using pseudo noise codes, said transmitter-receiver including n exclusive-OR means provided for respective data channels, n being an odd number, said exclusive-OR means producing exclusive ORs based on data input thereto and corresponding pseudo noise codes and outputting the exclusive ORs, respectively, majority logic means for making a majority logic-based judgment on the exclusive ORs output from said exclusive-OR means and for outputting a majority logic output, phase modulating means for subjecting the majority logic output to phase modulation and outputting a phase-modulated output, transmitting means for amplifying and modulating the output of the phase modulating means and radiating a resulting signal as a transmission wave, and receiving means for receiving a transmission wave and extracting the data of the respective channels from the transmission wave; and an unmanned carrying vehicle including a built-in transmitter-receiver having an arrangement identical to that of said transmitter-receiver.

12. The FA system according to claim 11, wherein said data includes image data.

13. An FA system comprising:

an FA computer provided with a transmitter-receiver for transmitting and receiving data by using pseudo noise codes, said transmitter-receiver including n exclusive-OR means provided for respective data channels, n being an odd number, said exclusive-OR means producing exclusive ORs based on data input thereto and corresponding pseudo noise codes and outputting the exclusive ORs, respectively, majority logic means for making a majority logic-based judgment on the exclusive ORs output from said exclusive-OR means and for outputting a majority logic output, phase modulating means for subjecting the majority logic output to phase modulation and outputting a phase-modulated output, transmitting means for amplifying and modulating the output of the phase modulating means and radiating a resulting signal as a transmission wave, and receiving means for receiving a transmission wave and extracting the data of the respective channels from the transmission wave; and a robot controller including a built-in transmitter-receiver having an arrangement identical to that of said transmitter-receiver.

14. The FA system according to claim 13, wherein said data includes image data.

* * * * *